United States Patent [19]

Grass et al.

[11] Patent Number: 4,791,525

[45] Date of Patent: Dec. 13, 1988

[54] CIRCUIT BREAKER WITH RETAINER FOR FILLER PLATE

[75] Inventors: William E. Grass, Whitefish Bay; Donald R. Sladek, Milwaukee, both of Wis.

[73] Assignee: Eaton Corporation, Cleveland, Ohio

[21] Appl. No.: 115,692

[22] Filed: Nov. 2, 1987

[51] Int. Cl.⁴ .............................................. H02B 1/04
[52] U.S. Cl. .................................. 361/363; 200/295; 361/376; 220/23.4
[58] Field of Search .................... 220/23.4; 248/223.3; 200/303, 307, 294, 295; 361/346, 353, 355, 356, 358, 361, 363, 376, 427

[56] References Cited

U.S. PATENT DOCUMENTS

| | | |
|---|---|---|
| 3,111,354 | 11/1963 | Hammerly et al. |
| 3,172,014 | 3/1965 | Johnson |
| 3,398,249 | 8/1968 | Dessert ............................... 361/363 |
| 4,358,815 | 11/1982 | Koslosky |
| 4,430,631 | 2/1984 | Forsell et al. |
| 4,454,565 | 6/1984 | Krasij ................................. 361/363 |
| 4,472,761 | 9/1984 | Koslosky |
| 4,557,047 | 12/1985 | M'Sadoques et al. |

OTHER PUBLICATIONS

Westinghouse, "WEB/WEHB/WFB Panelboard 225 Ampere Main Lug 3 Phase, 4 wire, 120/208 Volts Photo 10", Rev. 4/83.

Westinghouse "WEB/WEHB/WFB Panelboard 225 Ampere Type JB/KB/HKB Main Breaker, 3 Phase, 4 Wire, 277/480 Volts Photo 11" Rev. 4/83.

Primary Examiner—G. P. Tolin
Attorney, Agent, or Firm—Andrus, Sceales, Starke & Sawall

[57] ABSTRACT

In a circuit breaker (1) with a two piece molded housing (30) with a longitudinal mold parting line (33), a retainer (48) is mounted to the housing and has a bore (50) extending parallel to the parting plane for receiving a screw (58) which mounts a filler plate (52) covering open areas adjacent the breaker.

11 Claims, 2 Drawing Sheets

CIRCUIT BREAKER WITH RETAINER FOR FILLER PLATE

BACKGROUND AND SUMMARY

The invention relates to circuit breakers mounted in a panelboard, and more particularly to structure for retaining a filler plate which covers open areas adjacent the breaker.

Circuit breakers in panelboards have a frontside with a user-engageable pivoted operating handle extending therethrough and moveable in an arc. The breaker has a two piece molded housing, typically made of a thermoset polyester material.

In some known breakers, the housing sections are split along a lateral parting line in a parting plane perpendicular to the plane of handle movement along its arc, to provide a rear housing section and a front housing section. An example of molded housing sections with a lateral parting line is shown in Westinghouse "WEB/WEHB/WFB Panelboard 225 Ampere Main Lug 3 Phase, 4 Wire, 120/208 Volts Photo 10", April 1983, "WEB/WEHB/WFB Panelboard 225 Ampere Type JB/KB/HKB Main Breaker, 3 Phase, 4 Wire, 277/480 Volts Photo 11" April 1983. During molding, the front housing section is formed with a rearwardly extending bore. This bore is provided for receiving a screw which mounts a vertical filler plate adjacent the front surface of the breaker and covering open areas adjacent the breaker to the next breaker, etc. An example of a filler plate is shown at 78 in FIG. 5 of Koslosky et al U.S. Pat. No. 4,472,761, incorporated herein by reference.

In other known breaker housings, the two piece molded housing is split along a longitudinal parting line in a parting plane parallel to the plane of handle movement along its arc, such that there is an upper housing section and a lower housing section. An example of housing sections with a longitudinal parting line is shown in U.S. Pat. Nos. 3,111,354, 3,172,014 and 4,430,631, incorporated herein by reference. During molding of these types of housing sections, a rearwardly extending bore cannot be formed without an extra step in the molding process drawing such bore opening perpendicularly to the direction of mold separation, which extra step is cost objectionable.

The present invention addresses and solves the last noted problem in a particularly simple and cost effective manner.

DETAILED DESCRIPTION

Figure 1:
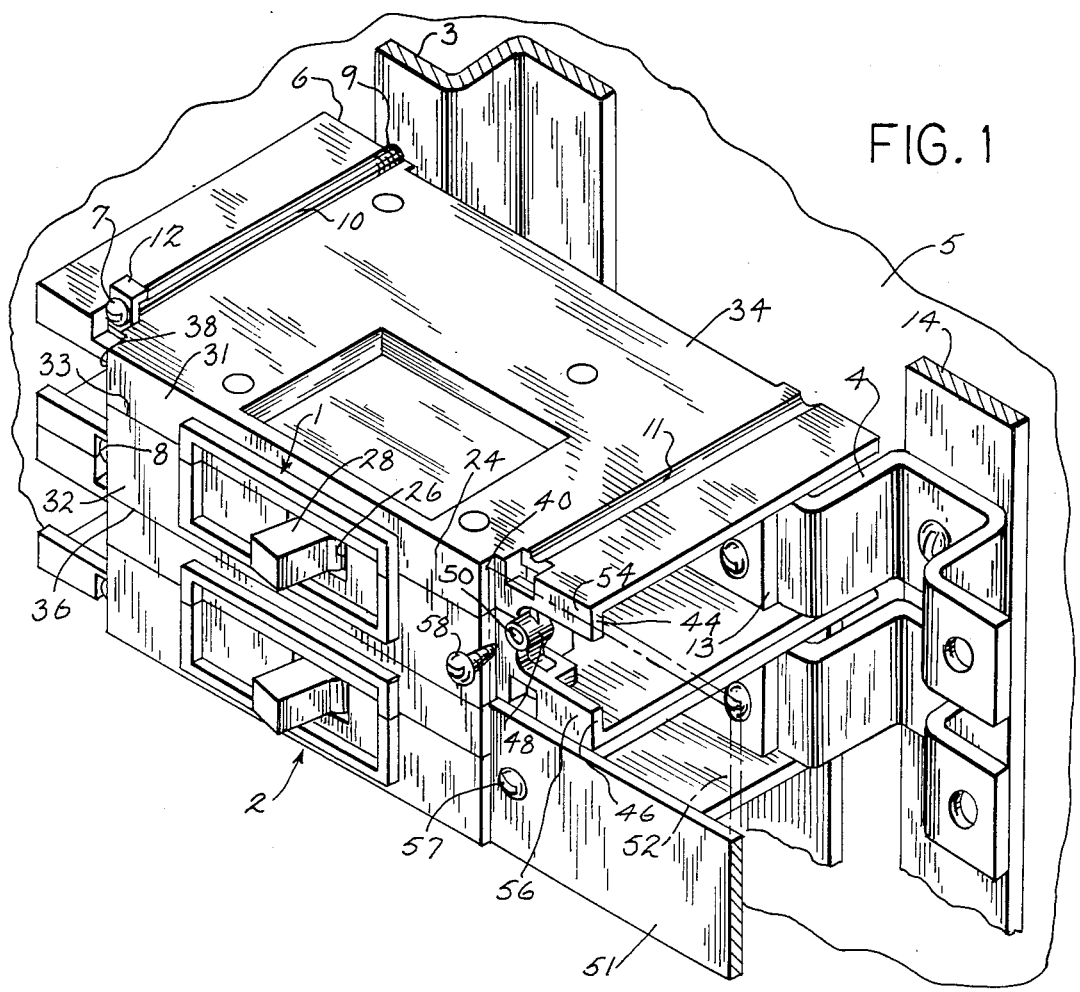
FIG. 1 is a perspective view of circuit breaker structure in accordance with the invention.

FIG. 1 shows circuit breakers 1 and 2 mounted to a rail 3 and a bus bar extension 4 of a bus bar 14 in a panelboard 5, as is known in the art, for example the above noted Westinghouse reference, and U.S. Pat. Nos. 4,358,815 and 4,472,761, incorporated herein by reference. The backside 6 of breaker 1 is mounted against rail 3 by bolts 7 and 8 extending from the front of the breaker rearwardly into threaded apertures such as 9 in the rail. The top of the breaker has rearwardly extending semicircular grooves 10 and 11 for left-hand and right-hand mounting orientations. Left groove 10 receives bolt 7. Right groove 11 is unused in the mounting arrangement shown. The bottom surface of the breaker also has semicircular grooves which mate with corresponding semicircular grooves in the top surface of breaker 2 to form circular holes for receiving mounting bolts. For example, mounting bolt 8 extends through the circular hole formed by the semicircular groove on the bottom of breaker 1 and the semicircular groove on the top of breaker 2. The front faces of such grooves are shouldered for receiving respective clamping washers such as 12 to provide added retention capability, particularly for example when breaker 1 is the topmost breaker, with no breaker thereabove. The right side of the breaker includes a terminal 13 mounted to bus bar extension 4 to support the right side of the breaker and also to provide electrical circuit connection to bus bar 14. The left side of the breaker has a terminal and wire lug connector (not shown) for electrical circuit connection.

Breaker 2 has a frontside 24 with an opening 26 through which a user-engageable pivoted operating handle 28 extends. Handle 28 pivots along an arc in a horizontal plane. Breaker 2 includes a housing 30 formed by a pair of molded housing sections 31 and 32 joined along a parting line 33 lying in a horizontal parting plane. Housing 30 thus has an upper housing section 31 with a horizontal top surface 34, and a lower housing section 32 with a horizontal lower surface 36. Housing 30 has a vertical backwall 6, and a vertical front wall 24. The housing has a vertical left side wall 38, and a vertical right side wall 40. The housing has an upper flange 44 extending horizontally rightwardly from top wall 34, and a lower flange 46 extending horizontally rightwardly from bottom wall 36. Upper flange 44 is integrally molded with upper housing section 31, and lower flange 46 is integrally molded with lower housing section 32. The left flange structure is comparable.

A retainer 48 is mounted between flanges 44 and 46 and has a bore 50 extending horizontally rearwardly and parallel to right side wall 40. A vertical filler plate 51 is shown in solid line for lower breaker 2, and a second filler plate, or an extension of the lower filler plate, is shown in dashed line at 52 for upper breaker 1. A threaded screw 57 mounts plate 51 to breaker 2, and a threaded screw 58 mounts plate 52 to breaker 1. Plate 52 engages the front edges 54 and 56 of flanges 44 and 46 and is mounted thereto by screw 58 extending rearwardly through an aperture in plate 52 and into bore 50. Filler plate 52 extends rightwardly from the front wall 24 of the breaker housing and covers the area between flanges 44 and 46, to cover open areas adjacent the breaker, and to extend to the next breaker to the right or to a dummy panel, and also to protect the bus bar 14 behind such filler plate, for which further reference may be had to the above noted incorporated U.S. Pat. No. 4,472,761 at filler plate 78, FIG. 5.

Figure 2:
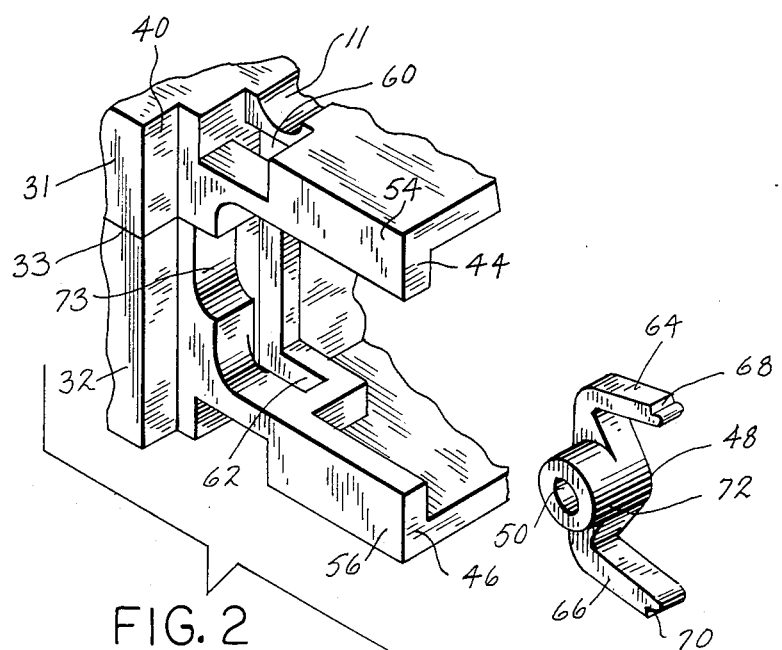
FIG. 2 is an enlarged exploded view of a portion of FIG. 1.
Figure 3:
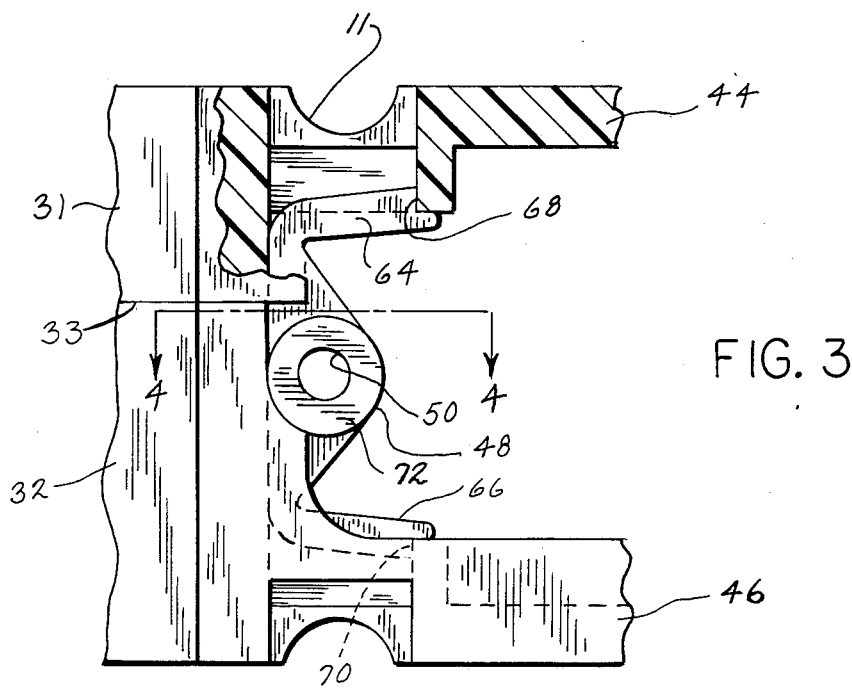
FIG. 3 is an enlarged partial sectional view of a portion of the structure in FIG. 1.
Figure 4:
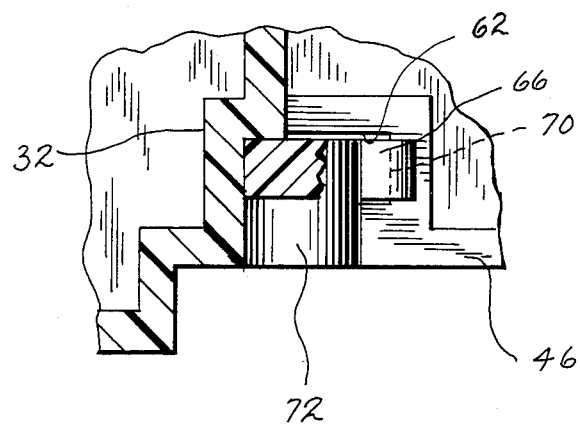
FIG. 4 is a sectional view taken along line 4—4 of FIG. 3.

Each flange 44 and 46 has a respective horizontal slot 60 and 62, FIG. 2, extending left to right therein. Retainer 48 has a pair of arms 64 and 66 engaging and nesting in respective slots 60 and 62 to mount retainer 48 to flanges 44 and 46. Retainer 48 is inserted horizontally leftwardly into slots 60 and 62 in snap-in locking relation. The retainer arms include detent structure provided by stop shoulders 68 and 70 on respective arms 64 and 66.

Central portion 72 of retainer 48 defines bore 50. Arms 64 and 66 extend generally oppositely from central portion 72 and along a vertical plane, which plane is perpendicular to horizontal parting plane 33. As retainer 48 is inserted horizontally leftwardly, arms 64 and 66 engage respective slots 60 and 62. As arms 64 and 66 engage the right edges of respective slots 60 and 62, arms 64 and 66 are flexed toward each other until stop shoulders 68 and 70 snap into place engaging the right edges of respective slots 60 and 62 to lock retainer 48 to the housing. Lower housing section 32 has a notch 73 formed therein at the frontside during molding, which notch receives central portion 72 of retainer 48 having bore 50.

An advantage of retainer 48 is that it eliminates an extra step during the molding of housing half sections 31 and 32 which would otherwise be needed to provide a horizontally rearwardly extending bore 50 for receiving a filler plate mounting screw 58. In circuit breakers having a vertical or lateral parting plane, such extra step during the molding process is unnecessary because a horizontal rearwardly extending bore is readily formed in the same direction as withdrawal of the front mold half.

Another advantage of retainer 48 is that it is a separate piece from housing 30 and nonintegral therewith. This is desirable because it enables the retainer to be formed of a different material than the housing. Circuit breaker housings are typically formed of a thermoset polyester material. This material is advantageous for circuit breaker application, but not for self-tapping screw applications because the tapped threads quickly become stripped after only a small number of re-uses. This is undesirable because there may be a need for multiple removals and replacements of filler plates as electrical service requirements change.

Retainer 48 is formed of a thermoplastic material, which material is better suited for receiving a self-tapping screw and which can withstand at least a small number re-uses, i.e. rethreading of a screw in bore 50 without stripping the threads in bore 50. In the preferred embodiment, the thermoplastic material of retainer 48 is polyterephthalate. Filler plate 52 is sheet metal.

It is recognized that various equivalents, alternatives and modifications are possible within the scope of the appended claims.

We claim:

1. A circuit breaker mounted to support structure in a panelboard, said breaker comprising a molded housing having a frontside with a user-engageable pivoted operating handle extending through said frontside and moveable in an arc in a given plane, said housing being formed by a pair of molded housing sections joined along a parting line lying in a parting plane parallel to said given plane of handle movement along said arc, said frontside of said housing lying in a plane perpendicular to said parting plane, a retainer mounted to a pre-assembled said housing and having a bore extending parallel to said parting plane and perpendicularly to said frontside of said housing, a filler plate mounted to said housing by removeable attachment means extending into said bore, said filler plate extending only from one side of said housing and parallel to said frontside of said housing to cover open areas adjacent said breaker, wherein said retainer comprises a central portion defining said bore, and a pair of arms each extending from said central portion to a respective one of said housing sections, and further wherein said housing includes slot means, and said retainer includes snap-in detent means engaging and nesting in said slot means in snap-in relation.

2. The invention according to claim 1 wherein said retainer is mounted to each of said housing sections and extends therebetween.

3. A circuit breaker mounted to support structure in a panelboard, said breaker comprising a molded housing having a frontside with a user-engageable pivoted operating handle extending through said frontside and moveable in an arc in a given plane, said housing being formed by a pair of molded housing sections joined along a parting line lying in a parting plane parallel to said given plane of handle movement along said arc, said frontside of said housing lying in a plane perpendicular to said parting plane, a retainer mounted to said housing and having a bore extending parallel to said parting plane and perpendicularly to said frontside of said housing, a filler plate mounted to said housing by removeable attachment means extending into said bore, said filler plate extending parallel to said frontside of said housing to cover open areas adjacent said breaker,
wherein said housing includes slot means, and said retainer includes snap-in detent means engaging and nesting in said slot means in snap-in relation,
wherein said slot means comprises a slot in each of said housing sections, and wherein said detent means of said retainer comprises a pair of flexible arms each having a stop shoulder, each arm engaging a respective said slot in the respective said housing section and flexing until said shoulder engages said slot to lock said retainer to said housing.

4. The invention according to claim 3 wherein said retainer comprises a central portion defining said bore, and wherein said arms extend generally oppositely from said central portion and along a plane perpendicular to said parting plane, and wherein said arms flex in said plane perpendicular to said parting plane, and wherein the direction of insertion of said retainer into said slots is parallel to said parting plane and parallel to said frontside of said housing.

5. The invention according to claim 4 wherein one of said housing sections has a notch formed therein at said frontside during molding, said notch receiving said central portion of said retainer having said bore.

6. The invention according to claim 3 wherein said attachment means is a screw threaded into said bore, and wherein said retainer is comprised of a different material than said housing, which retainer material is particularly adapted for receiving a self-tapping screw and which can withstand at least a small number of removals and then rethreading of a screw in said bore without stripping the threads in said bore.

7. The invention according to claim 6 wherein said molded housing is comprised of a thermoset polyester material, and wherein said retainer is comprised thermoplastic material.

8. The invention according to claim 7 wherein said thermoplastic material of said retainer is polyterephthalate.

9. A circuit breaker mounted to support structure in a panelboard, said breaker comprising a molded housing, said housing having a vertical front wall with a user-engageable pivoted operating handle extending forwardly through said front wall and moveable in a horizontal arc, said housing having a vertical back wall, said housing having a vertical left side wall, said housing having a vertical right side wall, said housing having a horizontal top wall, said housing having a horizontal bottom wall, said housing having an upper flange extending horizontally rightwardly from said top wall beyond said right side wall, said housing having a lower flange extending horizontally rightwardly from said bottom wall beyond said right side wall, said housing being formed by a pair of molded housing sections joined along a horizontal parting line such that said housing is comprised of an upper housing section and a lower housing section, said upper flange being part of said upper housing section, said lower flange being part of said lower housing section, a retainer mounted between said flanges and having a bore extending horizontally rearwardly and parallel to said right side wall, a vertical filler plate engaging the front edges of said flanges and mounted thereto by removable attachment means extending rearwardly into said bore, said filler plate extending rightwardly from said front wall and covering the area between said flanges.

10. The invention according to claim 9 wherein each of said flanges has a horizontal slot extending right to left therein, and wherein said retainer has a pair of arms engaging and nesting in respective said slots to mount said retainer to said flanges.

11. The invention according to claim 10 wherein said retainer is inserted horizontally leftwardly into said slots in snap-in locking relation.

* * * * *